United States Patent [19]
Toyoshima et al.

[11] Patent Number: 5,262,876
[45] Date of Patent: Nov. 16, 1993

[54] APPARATUS FOR DELAYING AND RECORDING TIME CODE SIGNALS

[75] Inventors: Makoto Toyoshima, Kanagawa; Hiroshi Kanno, Miyagi, both of Japan

[73] Assignee: Sony Corporation, Tokyo, Japan

[21] Appl. No.: 824,536

[22] Filed: Jan. 23, 1992

[30] Foreign Application Priority Data

Jan. 29, 1991 [JP] Japan ................................ 3-009171

[51] Int. Cl.⁵ ............................................. H04N 5/95
[52] U.S. Cl. ..................................... 358/337; 358/335; 360/14.3
[58] Field of Search ............... 358/310, 335, 311, 337, 358/320, 321, 338; 360/14.1, 14.2, 14.3, 13, 72.1, 72.2, 72.3, 74.4

[56] References Cited

U.S. PATENT DOCUMENTS

4,788,602 11/1988 Sekiguchi et al. .................. 358/337
5,144,453 9/1992 Suga et al. .......................... 358/310

Primary Examiner—Tommy Chin
Assistant Examiner—Thai Tran
Attorney, Agent, or Firm—William S. Frommer; Alvin Sinderbrand

[57] ABSTRACT

A time code signal recording circuit wherein necessary adjustment is performed not mechanically but electrically so that a relationship specified by a tape format can be satisfied with a high degree of accuracy. The time code signal recording circuit comprises a reference frame signal generating circuit, an advanced phase frame signal generating circuit for advancing, in phase, a reference frame signal from the reference frame signal generating circuit by a predetermined time, a time code signal generating circuit for generating a time code signal in accordance with the advanced phase frame signal, a time code signal delaying circuit for delaying the time code signal by a predetermined delay amount, and a time code signal recording head for recording a time code signal outputted from the time code signal delaying circuit. The predetermined delay amount is set to a value determined from an amount of displacement of a time code signal from a video signal recorded in a specific tape format so as to compensate for such displacement.

4 Claims, 6 Drawing Sheets

APPARATUS FOR DELAYING AND RECORDING TIME CODE SIGNALS

BACKGROUND OF THE INVENTION

1. Field of the Invention

This invention relates to a time code signal recording circuit suitably applied to a video tape recorder of the type which records a time code signal together with a video signal.

2. Description of the Prior Art

A video tape recorder for a broadcasting station or a video tape recorder for recording and reproducing a video signal of a high definition television system normally records, in addition to a video signal and a control signal, a time code signal for controlling such video signal for each frame or for each field.

Figure 3:
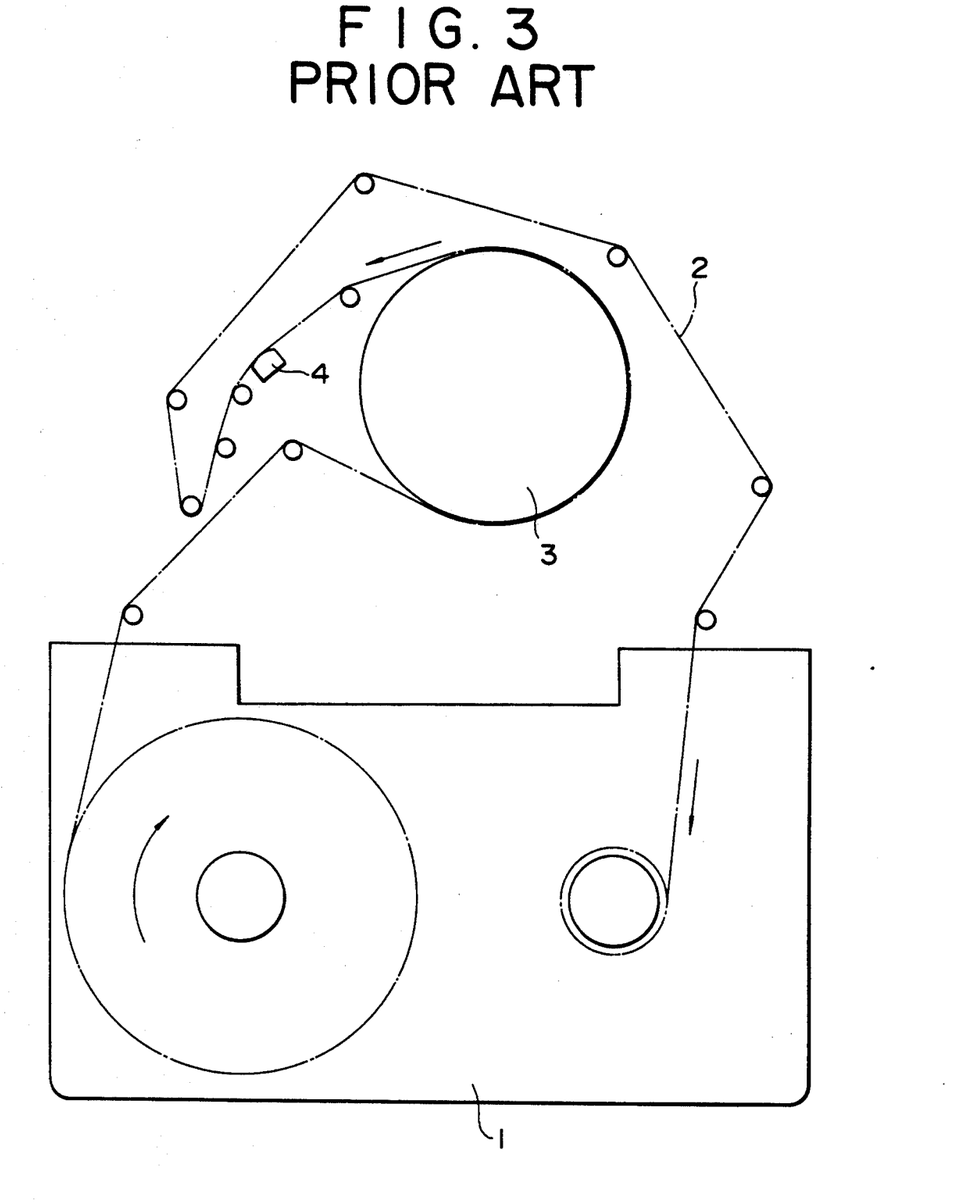
FIG. 3 is a schematic plan view of a tape feeding system of a video tape player.

A tape feeding system of an exemplary one of such conventional video tape recorders is shown in FIG. 3. Referring to FIG. 3, the tape feeding system shown includes a rotary drum 3 for feeding a magnetic tape 2 accommodated in a video cassette 1. Where the video tape recorder is designed for a high definition television system, since it is necessary to record or reproduce a video signal in a plurality of channels, a pair of magnetic heads (not shown) disposed adjacent each other and another pair of similar magnetic heads (not shown), and accordingly a total of four magnetic heads, are disposed in an angularly spaced relationship by about 180 degrees from each other on the rotary drum 3. The wrapping angle of the magnetic tape 2 on the rotary drum 3 is substantially equal to 180 degrees.

A composite head 4 is disposed adjacent a route of the magnetic tape 2 outside the video cassette 1 and includes a control head (not shown) disposed on an upper stage side for recording and reproducing a control signal CTL and a recording head disposed on a lower stage side and integrated with the control head for recording and reproducing a time code signal TC, that is, a time code head (not shown). The control head and the time code head, however, may otherwise be formed as separate members from each other.

Figure 4:
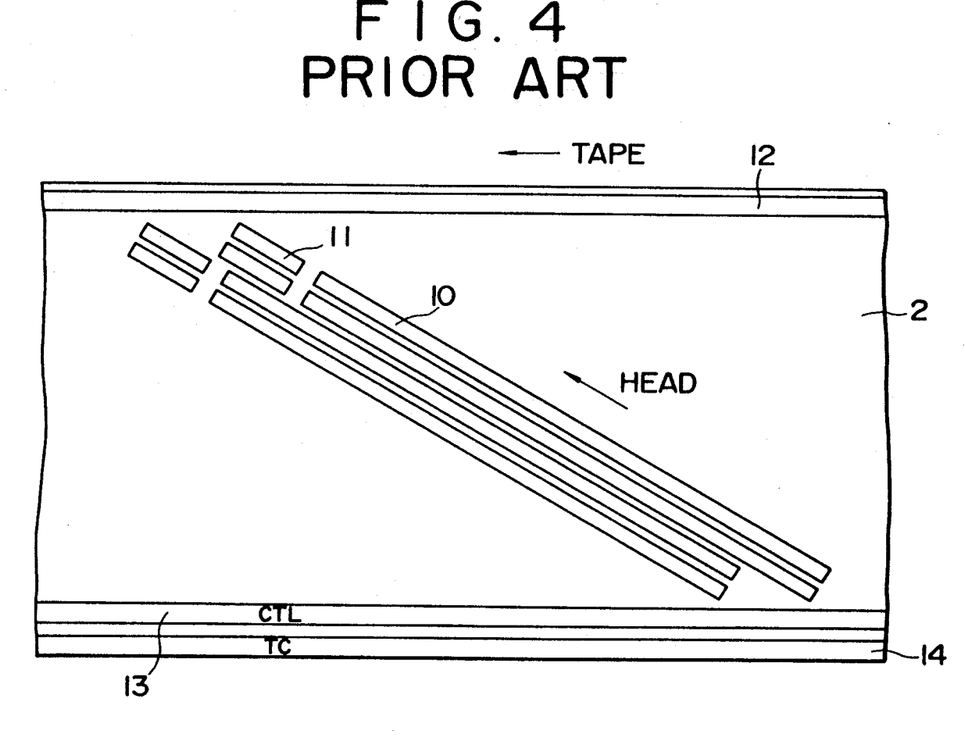
FIG. 4 is a diagrammatic representation showing an exemplary tape format when the video tape recorder of FIG. 3 is used.

Referring now to FIG. 4, there is shown an exemplary tape format when such video tape recorder as described above is used. A video signal is helically recorded simultaneously for two channels onto a pair of video tracks 10 of a magnetic tape 2 by such magnetic head arrangement as described above. A pair of digital audio tracks 11 are formed on extension lines of the video tracks 10. An analog signal is recorded onto an audio track 12 separately from a digital audio signal. The audio track 12 is formed along a longitudinal direction of the magnetic tape 2. A control signal CTL and a time code signal RECTC are recorded onto a control track 13 and a time code track 14, respectively, by the composite head 4 described above.

Figure 5:
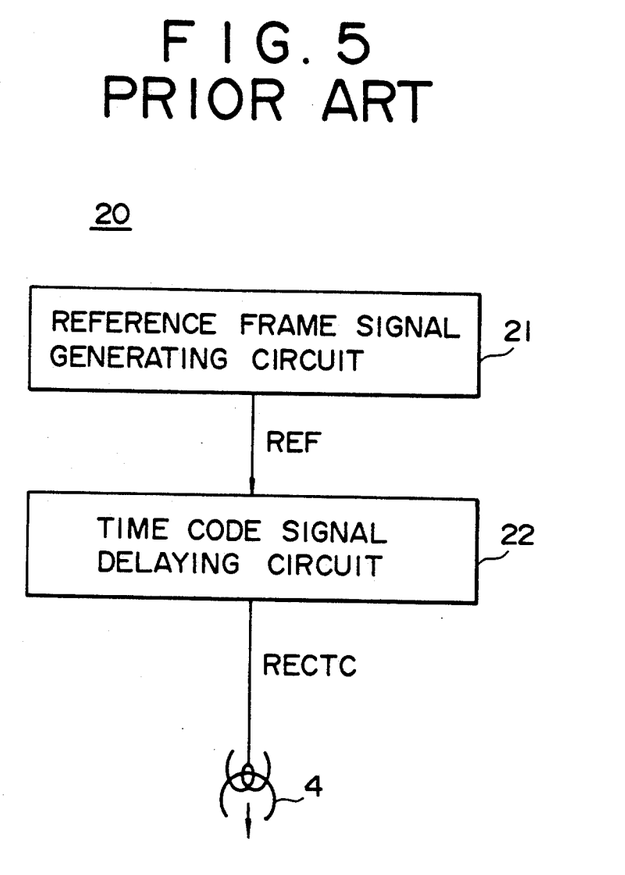
FIG. 5 is a block diagram showing an exemplary one of conventional time code signal recording circuits.
Figure 6A:
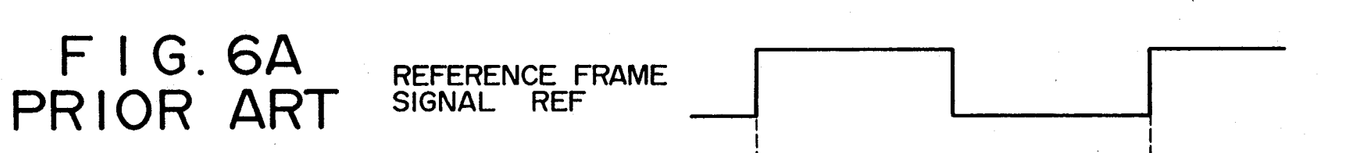
FIGS. 6(a) to 6(b) are time charts illustrating operation of the time code signal recording circuit of FIG. 5.
Figure 6B:
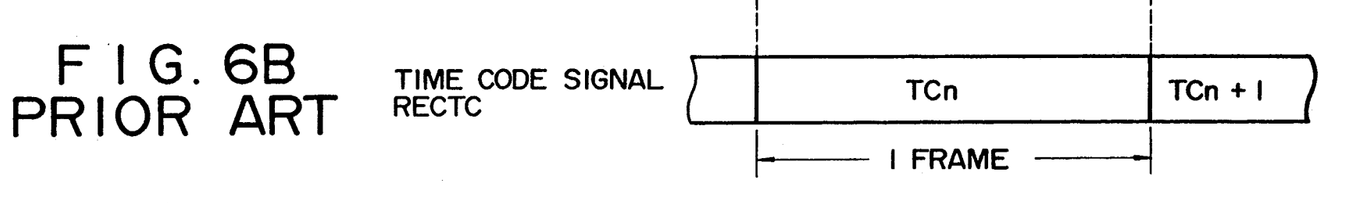

A time code signal RECTC to be recorded onto the time code track 14 is produced by such a recording circuit 19 as shown in FIG. 5. Referring to FIG. 5, the recording circuit 19 includes a reference frame signal generating circuit 21 for generating a reference frame signal REF which is such a rectangular wave signal of 60 Hz as seen from a waveform A shown in FIGS. 6(a) to 6(b). The reference frame signal REF thus generated is supplied to a time code signal generating circuit 22, at which such a time code signal RECTC which is synchronized with the reference frame signal REF as seen from another waveform B of FIG. 6 is generated. The time code signal RECTC thus generated is recorded by means of the composite head 4 (more particularly, the time code head of the composite head 4).

By the way, relative positions of a video signal, a control signal and a time code signal on such magnetic tape 2 are determined in advance depending upon a tape format. Since the relationship between a video signal and a time code signal depends upon a relationship between a tape pass system of the magnetic tabe 2 wrapped on the rotary drum 3 and the location or mounted position of the composite head 4, when the accuracy in mounting of the composite head 4 is low and the composite head 4 is not mounted at a prescribed position, the position of a time code signal RECTC recorded on the magnetic tape 2 will be different from the specific position of the tape format.

In such instance, it is a conventional countermeasure either to finely adjust the location of the composite head 4 or to mechanically work the associated elements with a high degree of accuracy. However, even where the mechanical accuracy is sufficiently high, it is still impossible to eliminate such adjustment. Thus, it actually is a conventional practice to perform fine adjustment of such composite magnetic head 4 for each of products when it is shipped from a factory.

SUMMARY OF THE INVENTION

It is an object of the present invention to provide a time code signal recording circuit wherein necessary adjustment is performed not mechanically but electrically so that a relationship specified by a tape format can be satisfied with a high degree of accuracy.

In order to attain the object, according to the present invention, there is provided a time code signal recording circuit, which comprises a reference frame signal generating circuit, an advanced phase frame signal generating circuit for advancing, in phase, a reference frame signal received from the reference frame signal generating circuit by a predetermined time, a time code signal generating circuit for generating a time code signal in accordance with the advanced phase frame signal from the advanced phase frame signal generating circuit, a time code signal delaying circuit for delaying the time code signal from the time code signal generating circuit by a predetermined delay amount, and a time code signal recording head for recording a time code signal outputted from the time code signal delaying circuit, the predetermined delay amount of the time code signal delaying circuit being set to a value determined from an amount of displacement of a time code signal from a video signal recorded in a specific tape format so as to compensate for such displacement.

In the time code signal recording circuit, a reference frame signal is advanced in phase by a predetermined time $\Delta d1$ by the advanced phase frame signal generating circuit, and a time code signal is generated in a synchronized relationship with the advanced phase frame signal by the time code signal generating circuit. The time code signal is then delayed in phase by a predetermined delay amount $\Delta d2$ by the time code signal delaying circuit. The predetermined delay amount $\Delta d2$ is a time obtained by adding the predetermined time $\Delta d1$ to a delay amount $\Delta d$ of the time code signal caused by displacement of a composite head from its reference position, that is, $\Delta d2 = \Delta d1 + \Delta d$. Thus, when the time code signal is delayed by the predetermined delay amount $\Delta d2$, the total delay time of the time code signal from the reference frame signal is given by $\Delta d2 - \Delta d1 = \Delta d$, and consequently, the recording time code signal is recorded in which the delay amount $\Delta d$ is included. Accordingly, even when the mounted position of the composite head is not its reference position with respect to a rotary drum, such displacement is electrically compensated for by the time code signal recording circuit, and a video signal, a control signal and a time code signal can be recorded in a correct relationship in accordance with a specific tape format.

With the time code signal recording circuit, since a displacement of a mechanical mounted position of a time code head can be corrected electrically, an otherwise necessary adjusting operation to finely adjust such mounted position of the head can be eliminated, and signal recording conforming to a specific tape format can be achieved readily.

The time code signal recording circuit may further comprise a time code signal correction value generating circuit for adding a delay amount caused by an amount of displacement of a time code signal from a video signal recorded in a specific tape format to the predetermined time of the advanced phase frame signal generating circuit and outputting a result of such additon as a predetermined delay amount to the time code signal delaying circuit. Alternatively or additionally, the time code signal recording circuit may further comprise a video signal/control signal displacement detecting circuit for detecting an amount of displacement between a video signal and a control signal being reproduced, and adding means for adding the predetermined delay amount from the time code signal correction value generating circuit to the amount of displacement from the video signal/control signal displacement detecting circuit and outputting a result of such addition as a predetermined delay amount to the time code signal delaying circuit. Where the time code signal recording circuit comprises all of the time code signal correction value generating circuit, video signal/control signal displacement detecting circuit and adding means, preferably it further comprises switching means for alternatively transmitting one of the predetermined delay amounts from the time code signal correction value generating circuit and the adding means. With the time code signal recording circuit, a suitable delay amount can be set for either of a recording mode and an editing mode, and accordingly, in an editing mode, a time code signal to be newly recorded is connected accurately with an already recorded time code signal. Consequently, the editing accuracy can be improved significantly.

The above and other objects, features and advantages of the present invention will become apparent from the following description and the appended claims, taken in conjunction with the accompanying drawings in which like parts or elements are denoted by like reference characters.

BRIEF DESCRIPTION OF THE DRAWINGS

FIGS. 2(a) to 2(e) are time charts illustrating operation of the time code signal recording circuit of FIG. 1;

DETAILED DESCRIPTION OF THE PREFERRED EMBODIMENT

Figure 1:
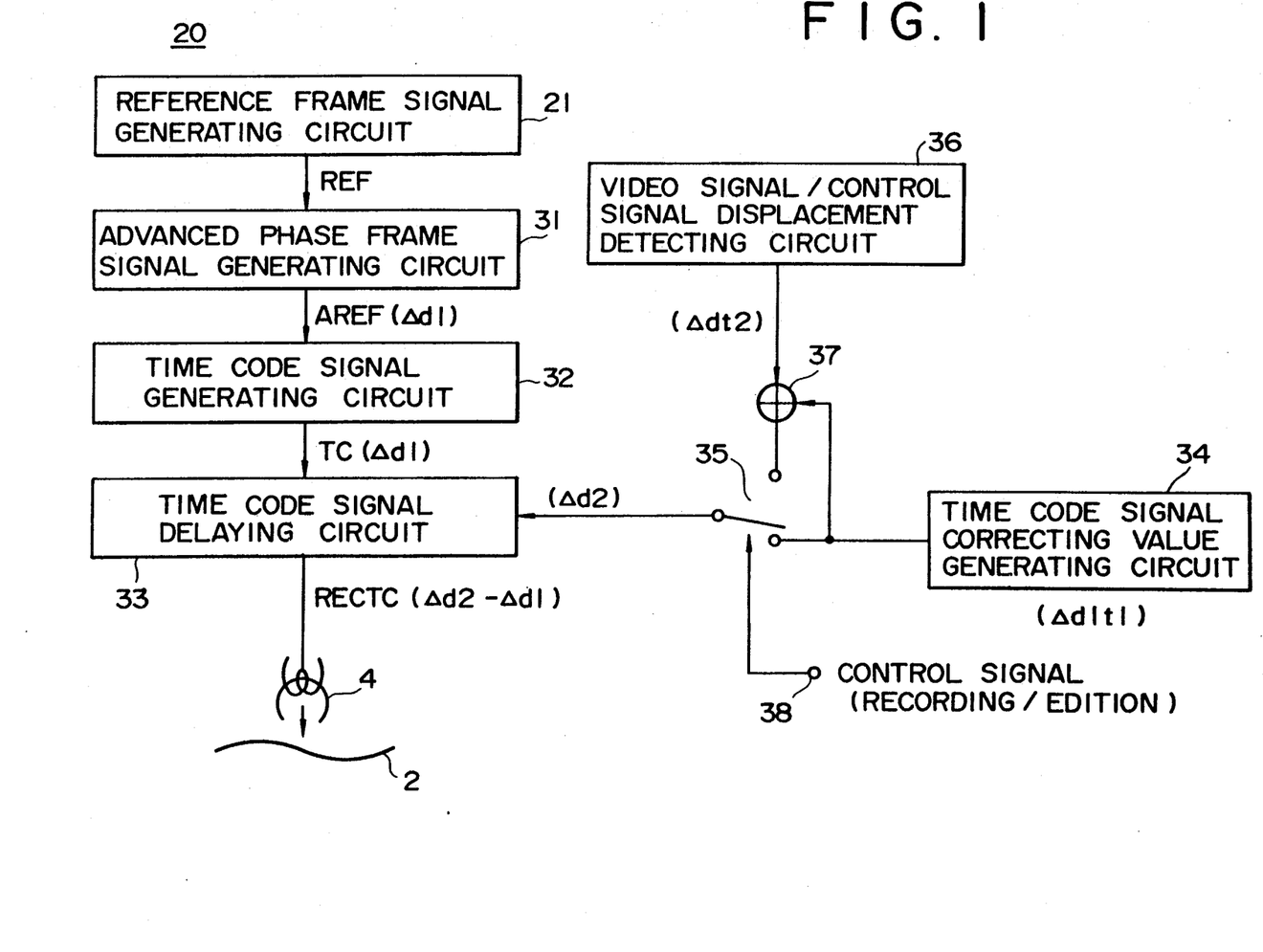
FIG. 1 is a block diagram of a time code signal recording circuit showing a preferred embodiment of the present invention.

Referring to FIG. 1, there is shown a time code signal recording circuit according to the present invention. The time code signal recording circuit is applied to a time code signal recording system of such a video tape recorder for a high definition television system as described hereinabove.

Figure 2A:
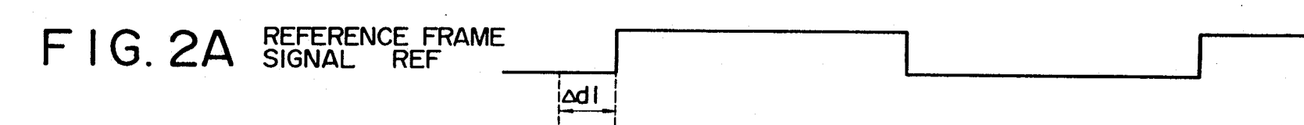
Figure 2B:
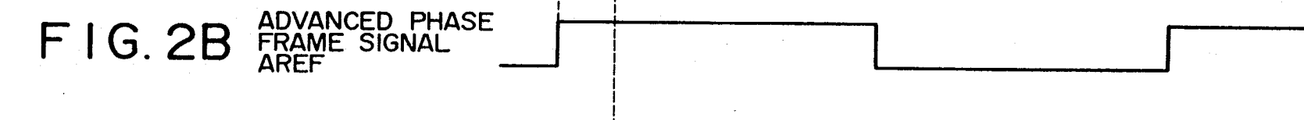

The time code signal recording circuit shown is generally denoted by 20 and includes a reference frame signal generating circuit 21 for generating a reference frame signal REF. The reference frame signal generating circuit 21 outputs a reference frame signal REF which has such a rectangular waveform of a frame period as seen from a waveform of FIG. 2(a). The reference frame signal REF is supplied to an advanced phase frame signal generating circuit 31, which thus produces, from the received reference frame signal REF, an advanced frame signal AREF which has such a waveform as shown in FIG. 2(b) and is advanced in phase by a predetermined time $\Delta d1$ with respect to the reference frame signal REF. Actually, the reference frame signal REF is delayed by an amount of one frame $-\Delta d1$ to form an advanced frame signal AREF. The predetermined time $\Delta d1$ is selectively set to a time which can absorb a time corresponding to an error of a mechanical mounted position or location of a composite head 4 as hereinafter described.

Figure 2C:
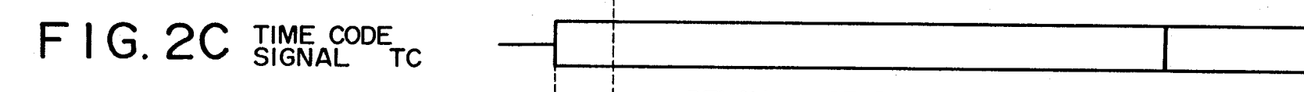

The advanced frame signal AREF is supplied to a time code signal generating circuit 32, at which a time code signal TC relating to a frame of a video signal to be recorded and having such a waveform as shown in FIG. 2(c) is produced in accordance with such advanced phase frame signal AREF. Accordingly, the time code signal TC is produced in synchronism with the advanced phase frame signal AREF.

Figure 2D:
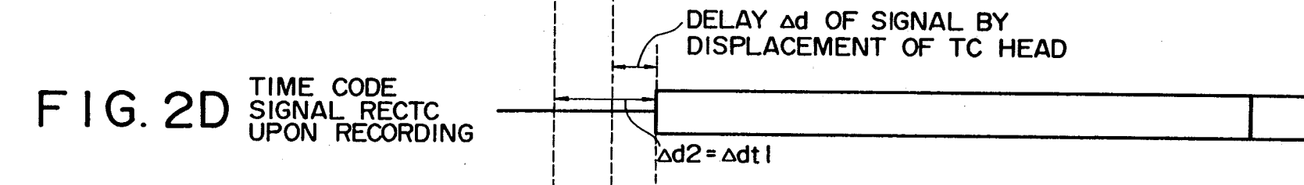
Figure 2E:
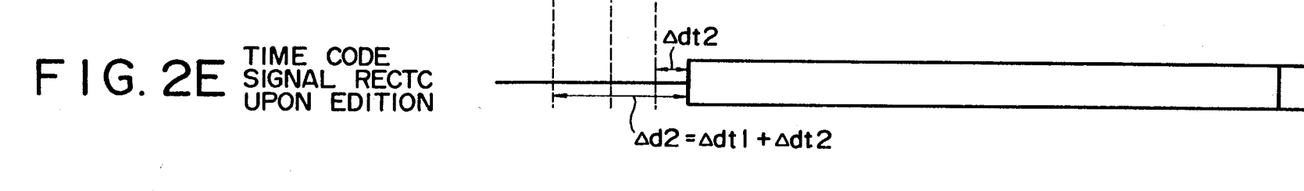

The time code signal TC is supplied to a delaying circuit 33, at which it is delayed by another predetermined time $\Delta d2$. Consequently, the time code signal TC is delayed, when it passes the delaying circuit 33, by a time obtained by subtraction of the predetermined advanced phase amount $\Delta d1$ from the predetermined time $\Delta d2$, that is, $\Delta d2 - \Delta d1 = \Delta d$. Here, $\Delta d$ is a delay amount of the time code signal TC caused by a displacement of the composite head 4 from its reference position. The thus delayed time code signal RECTC is supplied to the composite head 4 and recorded onto a magnetic tape 2 (refer to waveforms of FIG. 2(d) and FIG. 2(e).

Where a delay range amount of the delaying circuit 33 is represented by $\Delta x$, the delay range when a time code signal TC is to be recorded ranges from $-\Delta d1$ to $\Delta x - \Delta d1$. The delay range $\Delta x$ is set to $\Delta x > \Delta d1$ so that the time code signal recording circuit may cope with either case wherein the mounted position of the composite head 4 in the tape pass system is nearer or farther to or from the rotary drum 3.

Here, since the delay amount $\Delta d$ is just a delay amount of a time code signal TC from a reference frame signal REF, it is a parameter which varies among different video tape recorders, and besides, in editing a video tape, it is a parameter which varies also depending upon a relationship between a video signal and a control signal CTL recorded on a video tape used. Accordingly, the delay time $\Delta d2$ to be preset to the delaying circuit 33 varies depending upon whether a mere recording mode is selected or an editing mode is selected.

Therefore, the time code signal recording circuit of the present embodiment further includes a time code signal correction value generating circuit 34 which is used when a recording mode is selected, and a video signal/control signal displacement detecting circuit 36 which is used when an editing mode is selected.

The time code signal correction value generating circuit 34 generates a correction value $\Delta dt1$ including a delay amount $\Delta d$ which varies among different video tape recorders. The correction value $\Delta dt1$ is a value obtained by addition of an advanced phase amount $\Delta d1$ to a delay amount $\Delta d$, that is, a delay amount $\Delta d2$ to be set ($\Delta d2 = \Delta dt1 = \Delta d + \Delta d1$). The correction value $\Delta dt1$ is preset to the delaying circuit 33 by way of switching means 35. Consequently, a time code signal TC is delayed by a time obtained by subtraction of an advanced phase amount $\Delta d1$ from a delay time $\Delta d2$, that is, $\Delta d2 - \Delta d1 = \Delta d$.

Thus, where the composite head 4 is secured at a position displaced from the rotary drum 3 with respect to its reference position, a specific recording positional relationship can be satisfied by recording a time code signal in a delayed relationship by an amount corresponding to an amount of such displacement.

A correction value $\Delta dt1$ including a delay amount $\Delta d$ can be determined, for example, in the following manner. In particular, a standard tape is used on which a video signal, a control signal CTL and a time code signal TC are recorded in a correct relative positional relationship to each other. Then, if the standard tape is reproduced, a time code signal TC corresponding to an amount of displacement of the composite head 4 from its reference position is outputted. Using the reproduction time code signal TC, a correction value $\Delta dt1$ is calculated from a known advanced phase amount $\Delta d1$. The thus calculated correction value $\Delta dt1$ is inputted to the time code signal correction value generating circuit 34. Accordingly, memory means such as a RAM (random access memory) can be employed for the time code signal correction value generating circuit 34.

In the case of edition such as assembly or insertion, a new time code signal TC is recorded in accordance with a phase of a time code signal already recorded on a magnetic tape. To this end, before an editing operation is started, an amount of displacement $\Delta dt2$ between a video signal and a control signal CTL already recorded on the tape is detected by the video signal/control signal displacement detecting circuit 36. A correction value $\Delta dt1$ which belongs to a video tape recorder itself which is used as an editing machine is added to the displacement amount $\Delta dt2$, and an addition output of them ($\Delta dt1 + \Delta dt2$) is preset as a delay time $\Delta d2$ to the time code signal delaying circuit 33 (refer to the waveform E of FIG. 2).

Consequently, a new time code signal RECTC can be recorded conforming to a phase of an already recorded time code signal and in a condition wherein a mechanical displacement of the composite head 4 of the video tape recorder for edition is electrically compensated for.

It is to be noted that the switching means 35 in FIG. 1 is controlled to make a switching operation in response to a controlling signal received by way of a terminal 38. The control signal is a binary signal in response to which the switching means 35 is switched to such a position as seen in FIG. 1 when the video tape recorder is put into a recording mode, but is switched to the other position when the video tape recorder is put into an editing mode.

The displacement amount $\Delta d2$ described hereinabove can be determined by detecting an amount of variation of a tracking volume or by detecting an amount of correction of a control signal CTL by automatic tracking.

While the present invention is applied to a time code recording system of a video tape recorder of the high definition television system in the embodiment described above, it can be applied very suitably to video tape recorders for a broadcasting station and any other video tape recorders which are designed to record a time code signal together with a video signal.

Having now fully described the invention, it will be apparent to one of ordinary skill in the art that many changes and modifications can be made thereto without departing from the spirit and scope of the invention as set forth herein.

What is claimed is:

1. In a video signal recorder having means for recording video signals on a record medium; a time code signal recording apparatus comprising:

time code recording head means normally located in a reference position for recording a time code signal on said record medium in a predetermined format relative to the recorded video signals;

means for generating a reference frame signal;

means for generating an advanced phase frame signal by advancing said reference frame signal by a first predetermined time amount;

means for generating said time code signal in accordance with said advanced phase frame signal;

means for determining a second predetermined time amount based upon said first predetermined time amount and any displacement of said time code recording head means from said reference position; and means for delaying said time code signal, as supplied to said time code recording head means, by a difference between the second and first predetermined time amounts so as to compensate for any deviations of the recorded video and time code signals from said predetermined format as a result of displacement of said time code recording head means from said reference position.

2. A time code signal recording apparatus according to claim 1, further comprising means for recording control signals on said record medium, video signal/control signal displacement detecting means for detecting an amount of displacement between a reproduced video signal and a reproduced control signal obtained from said record means, and means for adding said second predetermined time amount from said means for determining to a time amount corresponding to the amount of displacement detected by said video signal/control signal displacement detecting means so as to produce a summed value and supplying said summed value to said means for delaying, whereupon the delaying means delays said time code signal by a difference between said summed value and said first predetermined time amount.

3. A time code signal recording apparatus according to claim 1, in which said means for determining adds said first predetermined time amount to a time amount corresponding to any displacement of said time code recording head means from said reference position so as to determine said second predetermined time amount.

4. A time code signal recording apparatus according to claim 3, further comprising means for recording control signals on said record medium, video signal/control signal displacement detecting means for detecting an amount of displacement between a reproduced video signal and a reproduced control signal obtained from said record means, means for adding said second predetermined time amount from said means for determining to a time amount corresponding to the amount of displacement detected by said video signal/control signal displacement detecting means so as to produce a summed value, and switching means for selectively transmitting to the delaying means one of said second predetermined time amount from said means for determining and said summed value from said means for adding, whereupon said delaying means delays said time code signal by the difference between said second and first predetermined time amounts and a difference between said summed value and said first predetermined time amount, respectively.

* * * * *